3 Sheets—Sheet 1.

D. JARVES.

GLUE CUTTING MACHINE.

No. 10,875. Reissued Oct. 18, 1887.

WITNESSES:
C. H. Raeder
T. C. Robertson

INVENTOR
Deming Jarves
BY T. J. W. Robertson
ATTORNEY.

THE NORRIS PETERS CO., PHOTO-LITHO., WASHINGTON, D. C.

D. JARVES.

GLUE CUTTING MACHINE.

No. 10,875. Reissued Oct. 18, 1887.

WITNESSES:
G. Raeder.
T. E. Robertson

INVENTOR
Deming Jarves.
BY T. W. Robertson
ATTORNEY.

THE NORRIS PETERS CO., PHOTO-LITHO., WASHINGTON, D. C.

D. JARVES.
GLUE CUTTING MACHINE.
No. 10,875. Reissued Oct. 18, 1887.
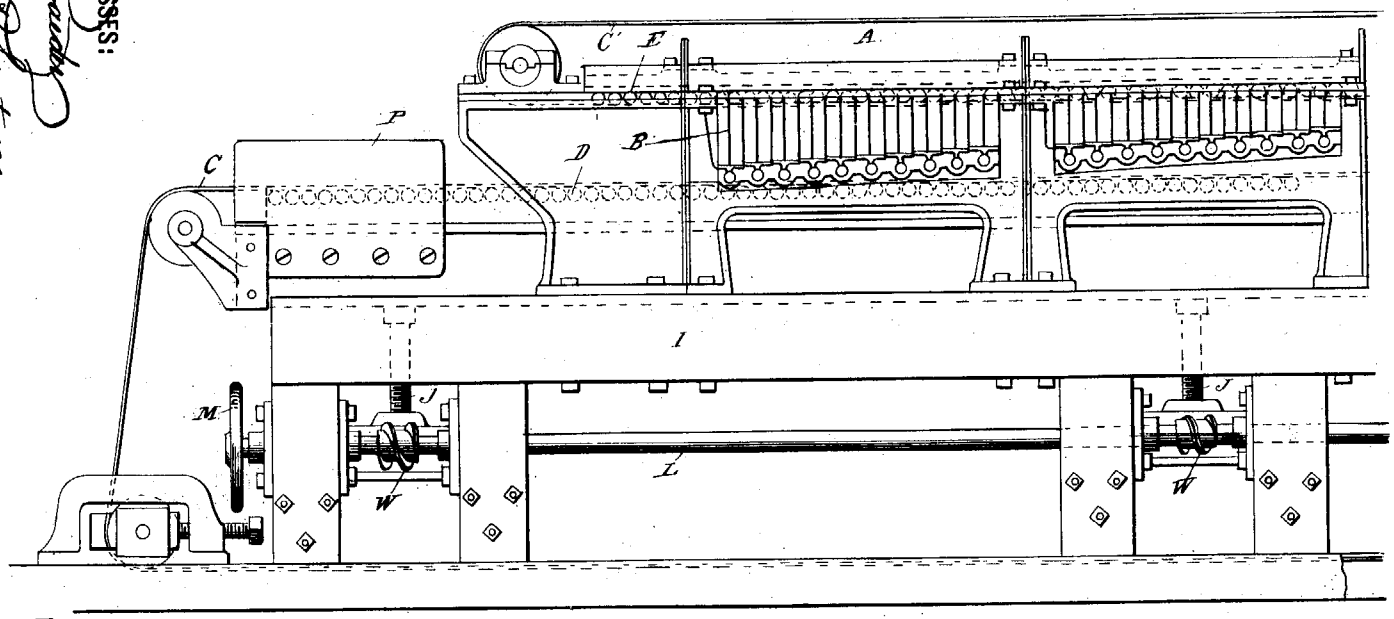
WITNESSES:
C. H. Raeder
T. E. Robertson
INVENTOR
Deming Jarves
BY T. J. W. Robertson
ATTORNEY.
THE NORRIS PETERS CO., PHOTO-LITHO., WASHINGTON, D. C.

UNITED STATES PATENT OFFICE.

DEMING JARVES, OF DETROIT, MICHIGAN.

GLUE-CUTTING MACHINE.

SPECIFICATION forming part of Reissued Letters Patent No. 10,875, dated October 18, 1887.

Original No. 359,391, dated March 15, 1887. Application for reissue filed June 21, 1887. Serial No. 242,013.

*To all whom it may concern:*

Be it known that I, DEMING JARVES, of Detroit, in the county of Wayne and State of Michigan, have invented new and useful Improvements in Glue-Cutting Machines; and I do hereby declare that the following is a full, clear, and exact description thereof, reference being had to the accompanying drawings, which form a part of this specification.

This invention relates to new and useful improvements in glue cutting machines; and the invention consists in the peculiar construction and combination of the parts, all as more fully hereinafter set forth.

Figure 1:
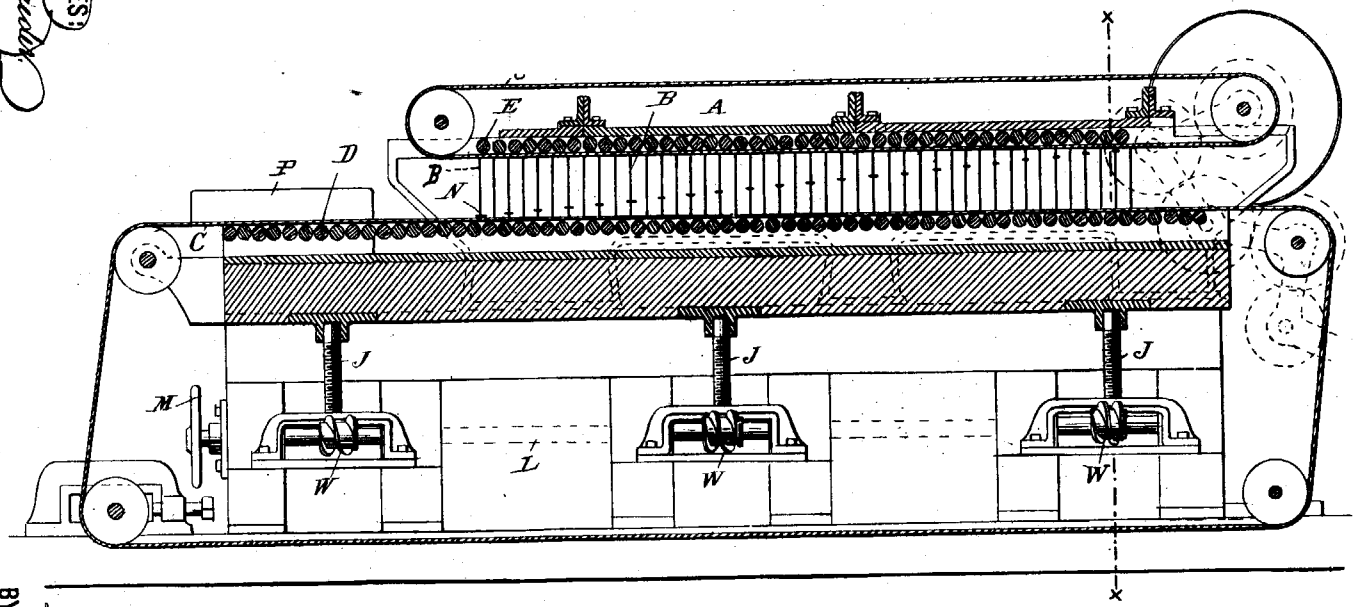
Figure 2:
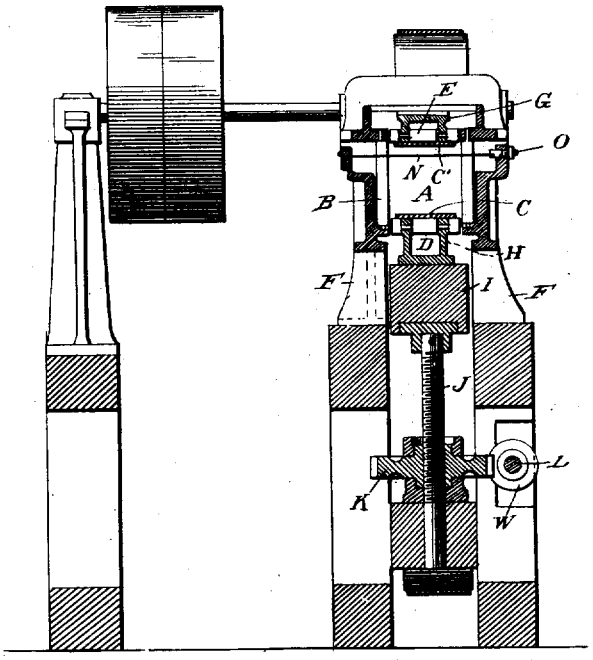
Figure 4:
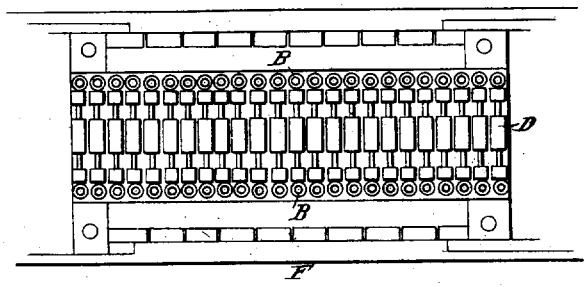

In the drawings which accompany this specification, Figure 1 is a vertical longitudinal section of my improved machine. Fig. 2 is a cross-section of the same on the line *x x* of Fig. 1. Fig. 3 is a side elevation of one end. Fig. 4 is a plan of a section of the carrier.

A is a horizontal glue-cake carrier, open at the ends and of rectangular cross-section, corresponding in size with the cross-section of the glue cakes to be carried. Its sides are formed by two parallel rows of vertical rolls, B, and the top and bottom are formed by two endless belts, C C′, respectively. That portion of the belt C which forms the bottom of the glue-cake carrier is supported on a row of horizontal rolls, D, and that portion of the belt C′ which forms the top of the glue-cake carrier is supported on the back by a similar row of horizontal rolls, E.

The vertical rolls B are suitably journaled on the inside of the parallel frames F, which form the sides of my machine and support the operating parts thereof.

The horizontal rolls E on top of the glue-cake carrier are suspended by means of hangers G from the top of the frames F, and the horizontal rolls D on the bottom of the glue-cake carrier are journaled upon standing blocks H, secured on top of the horizontal beam I. This latter beam is supported vertically adjustably on screw-supports J and laterally by the side frames, F.

The screws J are all provided with suitable worm-gear, W, actuated by a common shaft, L, and hand-wheel M, by means of which they may all be simultaneously actuated to raise or lower the beam I, with its row of rollers supported thereon.

N N are glue knives or wires placed transversely across the path of the glue cakes in the carrier. They are formed of flat steel bars or wire secured at the ends to the side frames of the machine and provided with the straining-screws O. These knives or wires pass at suitable distance apart through the interstices in the side rolls, which, being preferably placed together as near as possible, have to be notched to clear the knives or wires.

The knives are placed in an inclined series from front to rear, beginning near the bottom at the front end of the carrier, and with an equal rise step by step to near the top of the rear end, the vertical distance from knife to knife being about one-eighth of an inch—the usual thickness into which glue is cut for the market. Should an increased thickness be desired, a suitable number of knives is removed.

In practice the cakes of glue are placed one after another upon the front end of the lower carrier-belt, C, which for that purpose extends out in front and has the guide-plates P secured at the sides. This belt carries the cake into the carrier-box, where each cake is pressed into shape and subjected to the action of the knives, so that by the time it is discharged at the rear end of the machine into a suitable elevator it is all cut up into layers, which, however, still adhere to each other.

It will be understood that the spirit of my invention consists in the peculiar construction of my carrier, which enables me to make use of a continuous feed, and thereby produce a glue-cutting machine of a capacity heretofore unknown.

The parts which form the cake-carrier proper comprise the top and bottom rolls, D E, and the carrier-belts C C′. The vertical rolls B are merely intended for guide-rolls and to prevent the cutting knives or wires from tearing the edges of the glue cakes while the knives are pressing through, and the entire or partial omission (leaving a few rolls at the front for guiding) of the vertical rolls will not interfere with the successful operation of the machine, as there will be but little waste if the cutting-wires are relatively fine and well strained.

What I claim as my invention is—

1. In a glue-cutting machine, the combination of an upper and lower bed, each formed of a series of horizontal rolls, and of two carrier-belts traveling in the same direction, one passing over the lower bed and the other beneath the upper bed, and a series of cutting-wires, substantially as described.

2. In a glue-cutting machine, the combination of an upper and lower bed, each formed of a series of horizontal rolls, the lower bed of rolls being vertically adjustable, and two carrier-belts traveling in the same direction, one passing above the lower bed and the other below the upper bed, and a series of cutting-wires, substantially as described.

3. In a glue-cutting machine, the combination, with the frame, of the series of lower rolls, D, forming a bed, and the series of upper rolls, E, forming a bed, of the hangers G, suspending the rolls of the upper series from the frame, and the blocks H, supporting the rolls of the lower series, and two carrier-belts traveling in the same direction, one passing over the lower bed and the other under the upper bed, and a series of cutting-wires, all substantially as described.

4. In a glue-cutting machine, the combination, with the lower and upper series of horizontal rolls, forming an upper and lower bed, of two carrier-belts passing, respectively, above and below said series of rolls, and of an inclined series of knives or cutting-wires arranged between said carrier-belts, substantially as described.

5. In a glue-cutting machine, the combination, with the frame, of an upper series of horizontal rolls and a lower series of horizontal rolls, said rolls forming, respectively, an upper and lower bed for two carrier-belts, of an independent support for the lower rolls, and suitable screws and worm-gear for vertically raising and lowering said support, substantially as described.

6. In a glue-cutting machine, the combination of an open-ended box, the top, bottom, and sides of which are formed by rolls, and of two carrier-belts passing through said box upon opposite sides, substantially as described.

7. In a glue-cutting machine, the combination of four rows of rolls, forming the four sides of an open-ended horizontal box, and of two endless carrier-belts passing through said box, one over the bottom rolls and the other under the top rolls, substantially as described.

8. In a glue-cutting machine, the combination of the four rolls B B D E, forming the sides of an open-ended box, the carrier-belt C′, passing underneath the top rolls, and the carrier-belt C, passing over the bottom rolls and projecting in front beyond the carrier-box, substantially as described.

9. In a glue-cutting machine, the combination of the carrier-box A, the knives N, the side frames, F, the vertically-adjustable bed I, the screw-supports J, the worm-gear W, the shaft L, and wheel M, all arranged and operating substantially as described.

DEMING JARVES.

Witnesses:
A. BARTHEL,
H. S. SPRAGUE.